March 19, 1968  W. E. ANDERSON ET AL  3,373,915
MOLDABLE POUCH MATERIAL
Filed June 28, 1965
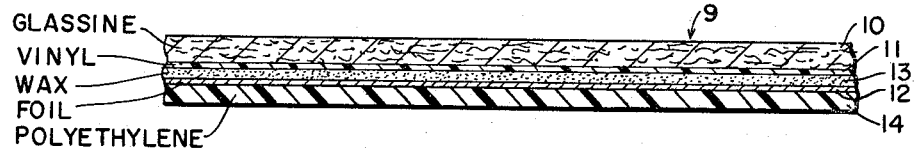
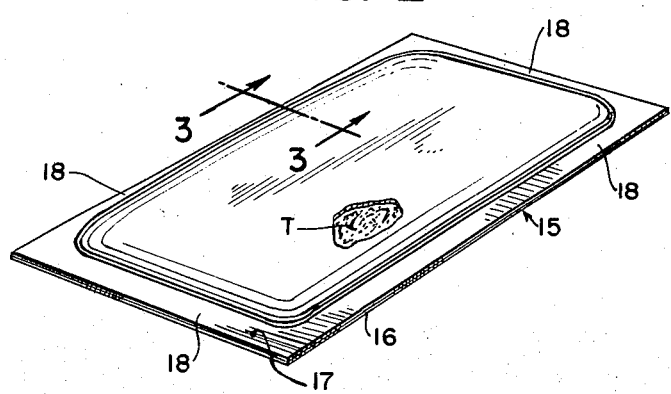
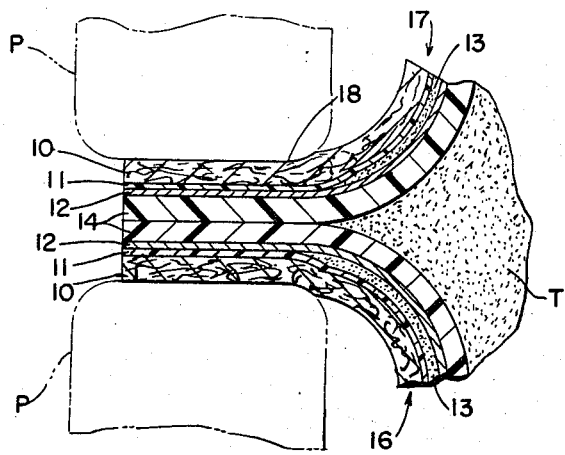
INVENTORS
WILLIAM E. ANDERSON,
GEORGE P. WIEDERECHT
BY
*Mandeville & Schweitzer*
ATTORNEYS 3,373,915
MOLDABLE POUCH MATERIAL
William E. Anderson and George P. Wiederecht, Blooms-
bury, N.J., assignors to Riegel Paper Corporation, New
York, N.Y., a corporation of Delaware
Filed June 28, 1965, Ser. No. 467,363
9 Claims. (Cl. 229—3.5)

ABSTRACT OF THE DISCLOSURE

The disclosure is directed to a laminated packaging material including an outer glassine layer moldably bonded to an inner metal foil layer by a wax layer and including a continuous heat activatable coating interposed between the glassine and foil layers, which heat activatable layer is adapted to unite the glassine and foil layers upon subjecting said laminate to heat sealing temperatures and pressures.

---

The present invention relates to packaging materials and more particularly to a new lamination for use in the manufacture of heat-sealed tobacco pouches and the like. Specifically, the invention relates to improved laminations of the foil-glassine type having a latent bonding material interposed between principal strata of the lamination.

Moldable laminations of metal foil and glassine, bonded by wax compositions of the general type disclosed in the Fisher et al. United States Patent No. 2,610,939, have found widely accepted use in the packaging of tobaccos and other hygroscopic materials. These laminations, in addition to providing excellent resistance to water vapor transmission, have had, by virtue of the intermediate wax bonding layer, desirable characteristics of moldability and pliability not readily available by other laminating techniques. Fabrication of these moldable laminates into pouches has been effected with conventional adhesives.

It has been deemed advantageous to employ such moldable laminations in manufacturing processes using heat sealants in lieu of conventional adhesives. However, while being generally acceptable in "cold sealing" processes, these moldable laminations are not entirely free from undesirable delamination after having been fabricated, in the presence of heat, into pouches and the like. That is to say, the heat required to effect a proper heat seal may cause the wax bond between the foil and glassine to become sufficiently weakened or destroyed to form gaps therebetween or to effect their delamination.

In accordance with the invention, the delamination and gapping problems may be successfully eliminated by providing an auxiliary delayed-action bonding agent on the glassine layer. More specifically, the bonding agent is heat activatable and therefore acts to reunite the glassine and foil upon the degradation or complete destruction of the wax bond caused by the application of heat and pressure during package forming operations. As will be understood, the great moldability provided by the wax bonding composition will be retained in non-heated areas of the lamination.

For a better understanding of the invention and its attendant advantages, reference should be made to the following detailed description taken in conjunction with the accompanying drawing, in which:

FIG. 1 is a schematic cross-sectional view of a lamination embodying the inventive principles;

FIG. 2 is a cross-sectional view of a non-delaminable, moldable pouch formed from the material of the invention; and FIG. 3 is an enlarged, fragmentary, cross-sectional view taken along line 3—3 of FIG. 2.

The new and improved packaging material 9 (FIG. 1) generally includes a base glassine stratum 10 coated with a vinyl lacquer composition 11 which is bonded to a foil stratum 12 by a wax formulation 13, the foil-glassine combination being provided with a polyethylene heat sealant 14.

Manufacture of the illustrated preferred embodiment of the invention may be completed as follows: A glassine web 10 or like pouch paper having a weight within the range of 20–40 pounds per ream (3,000 sq. ft.) is coated on its back side (unprinted side) with a vinyl coating 11 of approximately two pounds per ream by gravure methods. Adhesion of the vinyl coating on the glassine may be enhanced by a predetermined "striking in," as should be understood. A typical vinyl lacquer coating formulation includes, by weight, 20% vinylite VMCH; 5% dioctyl phthalate; and 75% acetone. Where the glassine is to be printed, as is typically the case in the contemplated commercial tobacco packaging application, the vinyl coating 11 may be applied by gravure during the printing operation. As will be explained in more detail hereinafter, the vinyl coating acts as a delayed action, heat activatable bonding agent in the finished laminate.

Thereafter, a thin foil 12, such as aluminum foil having a caliper of approximately .0035 inch, is laminated with a special wax formulation to the vinyl coated side of the glassine in a conventional waxer. In accordance with the invention, the wax formulation 13 is one which will provide the lamination with moldability and pliability as well as adequate water vapor impermeability when applied in proper weights. A formulation which has provided these properties when applied in amounts of approximately 5 to 7 pounds per ream includes microcrystalline wax, butyl rubber, resin and plasticizer, in proportions set forth in more detail in the Fisher et al. Patent No. 2,610,939. An exemplary wax formulation comprises, by weight, 83% amorphous wax; 12% polymerized resin; 3% heavy viscous liquid polybutene; and 2% "butyl" rubber.

The vinyl coated glassine-wax-foil combination is provided with the desired heat sealability by extrusion of polyethylene 14, in quantities of from approximately 5 pounds per ream to approximately 20 pounds per ream, onto the foil side. As should be understood, the specific weights of the polyethylene will be dictated by the packaging applications in which the finished moldable lamination is to be employed. Moreover, alternate external heat sealants may be employed as found necessary or desirable.

Pursuant to the invention, the new packaging material 9 may be readily fabricated by heat sealing techniques into pouches, bags, etc., which will have the desired soft and moldable "feel" and will not be subject to delamination in areas of heat sealing. Specifically, a representative pouch 15 (FIG. 2) may be fabricated by registering opposing sheets 16, 17 of the new material about an interposed charge of tobacco T or the like and heat sealing the peripheral edge portions 18, a common practice in the packaging industry.

As shown in FIG. 3, the wax laminant 13, which desirably provides the softness and moldability to the lamination, is melted and extruded from the heat seal areas by the application of predetermined heat and pressure (for example, through platens P) during the sealing. However, in accordance with the invention, the vinyl coating 11 is activated during the heat sealing operation, at temperatures which cause the flow of the wax 13, and acts to establish a new bond between the glassine and foil layers 10, 12. In other words, in the area of heat sealing, the original "soft," pliable wax bond is replaced or re-established by a second "hard" bond. It should be understood that, absent the provision of the delayed-action vinyl coating which is activated by the heat of the platens or rolls of sealing machinery, the wax bond between the glassine and foil would tend to be destroyed or substantially weakened to a point where subsequent delamination and gapping are highly probable, if not inevitable.

It is believed that most, if not all, of the wax laminant in the heat seal area is laterally displaced, and that any small amounts of wax which may remain in the heat seal area are dispersed within the heat activated vinyl lacquer 11. In any event, the non-delaminable nature of the lamination after pouch formation has been clearly established.

It will be appreciated that the above-described internally rebondable, moldable lamination may be economically manufactured by readily available finishing equipment and may be used in any packaging application where a moldable, heat-sealable, yet non-delaminable, wax bonded glassine-foil laminate is desired.

The moldable material and moldable pouch specifically illustrated and described are intended to be representative only, as certain departures may be made therefrom within the clear teachings of the invention. Accordingly, reference should be made to the following appended claims in determining the full scope of the invention.

What is claimed is.

1. A non-delaminable, moldable, heat-sealable packaging material comprising:
   (a) a glassine layer having an inner and outer surface and a weight of approximately 20–40 pounds per ream;
   (b) a continuous heat-activatable first coating having a weight of approximately 2 pounds per ream adhered to and completely covering the inner surface of said glassine layer;
   (c) a metal foil having an inner and outer surface and a caliper of approximately .0035 inch;
   (d) a moldable, heat-displaceable, wax laminate second coating present in amounts of approximately 5 to 7 pounds per ream softly bonding the inner foil surface to the completely coated inner surface of said glassine layer; and
   (e) a heat sealant applied to the outer surface of said foil;
   (f) said heat-activatable coating, upon the application of sufficient predetermined heat and pressure to said packaging material to cause the flow of the heat-displaceable wax laminant, being adapted to establish a new, hard, internal bond between the inner surface of said glassine layer and the inner surface of metal foil.

2. A packaging material in accordance with claim 1, in which:
   (a) said heat activatable coating comprises a vinyl resin adhesive composition.

3. A packaging material in accordance with claim 2, in which:
   (a) said vinyl resin adhesive composition comprises approximately 20% vinyl chloride-vinyl acetate copolymer, 5% dioctyl phthalate, and 75% acetone.

4. A packaging material in accordance with claim 1, in which:
   (a) said heat sealant comprises an extruded polyethylene film.

5. A non-delaminable, moldable, heat sealable packaging material, comprising:
   (a) a paper base stratum having an inner and outer surface;
   (b) a continuous heat-activatable coating deposited upon and completely covering the inner surface of said paper;
   (c) a metallic foil stratum having an inner and outer surface;
   (d) a moldable, heat-displaceable, wax laminant softly bonding said inner surface of said foil to the inner surface of said paper to provide a lamination having a substantial pliability;
   (e) a heat sealant applied to the outer surface of said foil;
   (f) said heat sealant and said continuous coating being activatable at predetermined temperatures at which said wax laminant is subject to flow and displacement;
   (g) whereby a new, hard bond between the inner surfaces of said foil and said paper base stratum may be established upon the application of pressure to said laminate in areas heated to said predetermined temperatures.

6. A packaging material in accordance with claim 5, in which:
   (a) said paper is a glassine having a weight in the range of 20–40 pounds per ream; and
   (b) said heat activatable resin adhesive is a vinyl composition coating having a weight of approximately two pounds per ream.

7. A packaging material in accordance with claim 6, in which:
   (a) said vinyl resin adhesive composition comprises approximately 20% vinyl chloride-vinyl acetate copolymer, 5% dioctyl phthalate, and 75% acetone.

8. A moldable pouch comprising:
   (a) opposed moldable walls each of which includes a glassine layer laminated to a metallic foil by a moldable, heat-displaceable wax laminant;
   (b) a continuous layer of heat activatable vinyl resin adhesive interposed between said glassine layers and said metallic foil layers;
   (c) a heat sealant superimposed on opposing surfaces of said metallic foil layers;
   (d) heat sealed seams joining peripheral edge portions of said opposed walls and including bonded portions of metallic foil united by said heat sealant;
   (e) said seams being substantially waxless and further including directly bonded portions of glassine and metallic foil united by the vinyl resin adhesive composition.

9. A non-delaminable, moldable, heat sealable packaging material, comprising:
   (a) a paper base stratum having an inner and outer surface;
   (b) a metallic foil stratum having an inner and outer surface;
   (c) a continuous heat activatable first coating deposited upon and completely covering the inner surface of one of said strata;
   (d) a second coating of a moldable, heat-displaceable wax laminant bonding the inner surface of said foil to the inner surface of said paper to provide a lamination having a substantial pliability;
   (e) a heat sealant applied to the outer surface of said foil;
   (f) said heat sealant and said first coating being activatable at predetermined temperatures at which said wax laminant second coating is subject to flow;
   (g) whereby a new bond between the inner surface of said foil and the inner surface of said paper base stratum may be established upon the application of pressure to said laminate in areas heated to said predetermined temperatures.

References Cited

UNITED STATES PATENTS

| | | | |
|---|---|---|---|
| 2,099,301 | 11/1937 | Hamersley et al. | 229—87 |
| 2,520,919 | 9/1950 | Forgie. | |
| 2,778,760 | 1/1957 | Hurst | 161—234 X |
| 3,078,201 | 2/1963 | Christie | 161—216 X |
| 3,152,694 | 10/1964 | Nashed et al. | |

OTHER REFERENCES

"Bakelite Vinyl Solution Resin VMCH," publication of Union Carbide Plastic Co., p. 7.

DAVIS T. MOORHEAD, *Primary Examiner.*

JOSEPH R. LECLAIR, *Assistant Examiner.*